US007860840B2

(12) United States Patent
Johnson et al.

(10) Patent No.: US 7,860,840 B2
(45) Date of Patent: Dec. 28, 2010

(54) MAINTAINING CORRECT TRANSACTION RESULTS WHEN TRANSACTION MANAGEMENT CONFIGURATIONS CHANGE

(75) Inventors: James E. Johnson, Bellevue, WA (US); William James Carley, Woodinville, WA (US); Michael R. Clark, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1030 days.

(21) Appl. No.: 10/958,715

(22) Filed: Oct. 5, 2004

(65) Prior Publication Data
US 2006/0075277 A1   Apr. 6, 2006

(51) Int. Cl.
*G06F 7/00* (2006.01)
*G06F 17/00* (2006.01)

(52) U.S. Cl. ........................................... 707/674
(58) Field of Classification Search ................ 707/674, 707/636, 648, 678, 682
See application file for complete search history.

(56) References Cited

U.S. PATENT DOCUMENTS

| | | | | |
|---|---|---|---|---|
| 5,920,863 | A * | 7/1999 | McKeehan et al. | 707/10 |
| 6,157,927 | A * | 12/2000 | Schaefer et al. | 707/103 R |
| 6,233,587 | B1 * | 5/2001 | Tandon | 707/103 R |
| 6,247,023 | B1 * | 6/2001 | Hsiao et al. | 707/202 |
| 6,266,698 | B1 * | 7/2001 | Klein et al. | 709/227 |
| 6,334,114 | B1 * | 12/2001 | Jacobs et al. | 705/26 |
| 6,463,456 | B1 * | 10/2002 | Kan et al. | 709/201 |
| 7,072,912 | B1 * | 7/2006 | Verma et al. | 707/202 |
| 2001/0047313 | A1 * | 11/2001 | Kanai | 705/26 |
| 2002/0087366 | A1 * | 7/2002 | Collier et al. | 705/5 |
| 2002/0107967 | A1 * | 8/2002 | Klein et al. | 709/227 |
| 2004/0088717 | A1 * | 5/2004 | Chen et al. | 719/321 |
| 2005/0091668 | A1 * | 4/2005 | Cargille et al. | 719/328 |
| 2005/0144171 | A1 * | 6/2005 | Robinson | 707/9 |

OTHER PUBLICATIONS

Wilson et al. Distributed Transactions and Two-Phase Commit, 2003, SAP AG. pp. 1-39.*

* cited by examiner

*Primary Examiner*—John R Cottingham
*Assistant Examiner*—Hexing Liu
(74) *Attorney, Agent, or Firm*—Workman Nydegger

(57) ABSTRACT

The present invention extends to methods, systems, data structures, and computer program products for maintaining correct transaction results when transaction management configurations change. An intermediate transaction manager is transparently interposed between one or more resource managers and a plurality of transaction managers. The intermediate transaction manager multiplexes and intercepts calls and notifications between the one or more resource managers and the plurality of transaction managers. The intermediate transaction manager is configured to wrap recovery cookies with transaction manager type information and identity information that identify transaction managers. The information can be used to re-attach to the transaction manager to recover the correct outcome of the transaction. The intermediate transaction manager can also intercept recovery-complete calls directed to a specific transaction manager and send the recovery-complete call to each of the plurality of transaction managers. Resource managers can receive, store, and send wrapped recovery cookies.

39 Claims, 3 Drawing Sheets

MAINTAINING CORRECT TRANSACTION RESULTS WHEN TRANSACTION MANAGEMENT CONFIGURATIONS CHANGE

CROSS-REFERENCE TO RELATED APPLICATIONS

Not Applicable.

BACKGROUND OF THE INVENTION

1. The Field of the Invention

The present invention relates to transaction processing. More specifically, the present invention relates to maintaining correct transaction results when transaction management configurations change.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, transaction processing, Web browsing, and printing documents) include the exchange of electronic messages between a number of computer systems and/or other electronic devices via wired and/or wireless computer networks.

A feature of most, if not all, transaction processing systems is what is commonly referred to as a two-phase commit protocol. A two-phase commit protocol enables a number of different components (as part of the same transaction) to do some processing and agree on an outcome. The two-phase commit protocol also enables different components to be returned to their pre-transaction state when some error conditions occur. Since, a single transaction can update many different components (e.g., databases), the two-phase commit protocol strategy is designed to ensure that either all the components are updated or none of them, so that the components remain consistent. That is, the two-phase commit protocol attempts to maintain the atomicity of transactions by executing transactions in two phases, a prepare phase and a commit phase.

In a prepare phase, a transaction coordinator (e.g., a transaction manager) identifies what resources are necessary to a transaction and what components (e.g., resource managers) should be contacted to access the necessary resources. The transaction coordinator can then attempt to contact the components by sending a request to prepare message (hereinafter referred to simply as a "prepare message") requesting that the components commit to performing an operation on the necessary resource according to the transaction.

Components that are in a state (or that subsequently transition into a state) capable of performing operations requested in a prepare message, indicate this capability to the transaction coordinator by sending a prepare complete message (hereinafter referred to simply as a "prepare complete message") to the transaction coordinator. A prepare complete message further indicates that a component will remain in a state capable of applying the requested operations even if the component subsequently fails. Along with sending a prepare complete message, a component can record a log entry in a log file. The log entry indicates the prepare complete message was sent and potentially includes some state information that allows the component to return to the prepare complete state during failure recovery. When all the contacted components (i.e., each component that was sent a prepare message) respond with prepare complete messages, the transaction coordinator can then proceed to a commit phase.

However, if any component does not respond or responds that it is not capable of performing operations according to the transaction, the transaction coordinator may abort the transaction. Alternately, the transaction coordinator can attempt to contact another component with access to the necessary resource (by sending a prepare message to the component) to request performance of the operations that would otherwise have been performed by the non-responsive or negatively responding component.

In a commit phase (after a prepare phase is successful), the transaction coordinator sends a commit (or abort) transactional message (hereinafter referred to as a "commit (or abort) message") to all components participating in the transaction (i.e., any component from which the transaction coordinator received a prepare commit message). Reception of a commit message causes a component to perform any operations that were indicated as being prepared in a previous corresponding prepare complete message. A component can also write appropriate log entries for any performed operations to a log, including a commit entry. After a component successfully performs the indicated operations, the component sends a commit complete transactional message (hereinafter referred to as a "commit complete message") to the transaction coordinator. After receiving commit complete messages from all contacted components (each component that was sent a commit message), the transaction coordinator can advance its beginning of log past the commit record.

It may be that a component fails after sending a prepare complete message (and thus does not immediately receive a corresponding commit (or abort) message. Thus, when the component is restated, the component can replay log entries to re-create the state before the failure occurred. Accordingly, a two-phase commit protocol used along with logs can facilitate recovery from some errors that occur during a transaction.

In some environments, recovery cookies are utilized to attempt to address component failures after prepare complete messages have been sent. In these environments, a prepare message includes (or is sent along with) a recovery cookie. The recovery cookie includes information necessary for transaction recovery (e.g., the identity of the transaction coordinator) in the event that a component fails. Each component included in a transaction is sent a corresponding recovery cookie. Components store recovery cookies (e.g., in log entries) for presentation back to the transaction coordinator when it is necessary to recover a transaction (e.g., after a component failure).

To recover a transaction (e.g., when a component restarts), a component typically issues reenlist calls specifying the recovery cookie it received. Reenlist calls are essentially calls to the transaction coordinator (identified from the recovery cookie) requesting state for transactions that were open when the component failed. For example, a reenlist call can request an indication of whether or not a transaction for which the component sent a prepare complete message was actually committed. After a component issues all reenlist calls it intends to issue, it can issue a recovery-complete call to the transaction coordinator. In response, the transaction coordinator can complete its internal cleanup of the state it has for the component but that the component is unaware of.

Unfortunately, even when using recovery cookies, not all errors that occur during a transaction can be sufficiently addressed. In some environments, it is possible for transaction management configurations to change over time and for a transaction coordinator to "forget" state related to a transaction. For example, an old log can be loaded at a transaction coordinator (e.g., before a component can initiate recovery) resulting in an ancestor instance of the transaction coordinator. If a recovering component issues a reenlist call to the ancestor transaction coordinator, the ancestor transaction coordinator may have no memory of the identified transaction. For example, the ancestor transaction manager may not recognize a recovery cookie issued by the transaction coordinator before the old log was loaded. Thus, the ancestor transaction manager may respond incorrectly (e.g., indicating an abort when a commit is in fact the correct response). Alternately, the ancestor transaction coordinator may not provide the component any answer and the component may remain "in doubt". Manual intervention, for example, from an administrator, may be required to transition the component out of the "in doubt" state.

At least one mechanism has been developed for automatically identifying that a current instance of a transaction manager is different than the instance of the transaction manager that sent a prepare message. These mechanisms can be used to transition a component out of an "in doubt" state. One particular mechanism, commonly referred to as amnesia detection, utilizes a set of algorithms during component recovery to detect transaction coordinator instances. For example, the set of algorithms can detect a different instance of transaction coordinator (e.g., resulting from loading an older log file) and/or can detect a different transaction coordinator (e.g., when a component connects to a different transaction manager).

When a different instance or transaction coordinator is detected during recovery, the set of algorithms can cause the component to become operational without harming the component. That is, the set of algorithms cause the component to become operational, while leaving the component "in doubt" with respect to transactions initiated by other instances or other transaction coordinators. Thus, the component can recover in a manner that does not cause data corruption or other harm to the component (e.g., that can result from aborting a transaction that was actually committed or committing a transaction that was actually aborted).

Unfortunately, recovery mechanisms that utilize amnesia detection do not insure that a component recovers into a state that would have resulted had there been no failure. That is, during recovery amnesia detection does not identify the correct answer for transactions. For example, amnesia detection does not insure that a component that was sent a commit (or abort) message from a different instance of a transaction coordinator will implement the commit (or abort) during recovery. Thus, while amnesia detection can mitigate component harm during recovery, manual intervention may be required to remove or correct "in doubt" transactions that remain after recovery.

To increase performance, some environments distribute transaction coordinator functionality across a number of specialized transaction coordinators. Each specialized transaction coordinator can be assigned specific tasks. Thus, when implementing a transaction, a component may communicate with a number of different specialized transaction coordinators. Further, a component may or may not be aware of the specialized transaction coordinators it is communicating with to coordinate the transaction.

Additionally, the configuration of transaction managers can change. For example, transaction managers may fail and/or (re)start (potentially at different times) and the specified tasks assigned to a specialized transaction coordinator may change. It may also be that, from time to time, a database is moved between different systems. Thus, recovery cookies and amnesia detection algorithms, which can recover from or mitigate the effects of a failure between a component and a single transaction manager, are typically not sufficient for recovering from or mitigating a failure in a multiple transaction coordinator environment.

In at least one mechanism, transaction coordinators drive the recovery process. A transaction coordinator monitors a component and, during recovery, the transaction coordinator can query the component for transactions that are "in doubt." The components responds to the request by sending a list of "in doubt" transactions to the transaction coordinator. The transaction coordinator then parses the list to identify any transactions that are related the transaction coordinator. This is advantageous, since the transaction manager can control when recovery occurs.

However, during component recovery, and especially when coordinator functionality is distributed across a number of specialized transaction coordinators, the recovering component can connect to a new transaction manager that is different from a prior transaction coordinator the component was connected to (e.g., before a failure occurred). In any event, the component may have transactions from the prior transaction coordinator that are "in doubt." However, since the component is no longer using the prior transaction coordinator, the prior transaction coordinator will never query the component for a list of "in doubt" transactions. Further, since the new transaction manager is unaware of transactions related to the prior transaction manager, the new transaction manager will ignore any "in doubt" transactions related to the prior transaction coordinator. Thus, in environments where transaction management configurations change, a component can be prevented from obtaining a correct result for transactions related to a prior transaction coordinator.

Therefore systems, methods, and computer program products for maintaining correct transaction results when transaction management configurations change would be advantageous.

BRIEF SUMMARY OF THE INVENTION

The foregoing problems with the prior state of the art are overcome by the principles of the present invention, which are directed towards methods, systems, data structures, and computer program products for maintaining correct transaction results when transaction management configurations change. An intermediate transaction manager is transparently interposed between one or more resource managers and a plurality of transaction managers. The intermediate transaction manager intercepts and multiplexes communication (e.g., calls and notifications) between the one or more resource managers and the plurality of transaction managers.

A transaction manager, from among the plurality of transaction managers, sends a recovery cookie to a resource manager, for example, so that the resource manager can recover the correct outcome of a transaction between the transaction manager and the resource manager when the transaction fails. An intermediate transaction manager intercepts the recovery cookie and wraps with transaction manager type information and identity information that differentiate the transaction manager from the other transaction managers. Accordingly, the transaction manager type information and identity information can be used to re-attach to the transaction manager to recover the correct outcome of the transaction.

The intermediate transaction manager sends the wrapped recovery cookie to the resource manager. The resource manager receives and stores the wrapped recovery cookie. Subsequently, the resource manager detects that the transaction between the transaction manager and the resource manager has failed. In response to detecting the failure, the resource manager sends the wrapped recovery cookie to a transaction manager.

The intermediate transaction manager intercepts the wrapped recovery cookie. The intermediate transaction manager utilizes the transaction manager type information and identity information included in the wrapped recovery cookie to identify to the transaction manager. The intermediate transaction manager sends the recovery cookie to the transaction manager.

The transaction manager receives the recovery cookie and, in response to the recovery cookie, sends the outcome of the transaction to the resource manager. The resource manager receives the outcome of the transaction.

The intermediate transaction manager can also intercept recovery-complete calls from a specific resource manager and send the recovery-complete call to each of the plurality of transaction managers. Resource managers can receive, store, and send wrapped recovery cookies.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
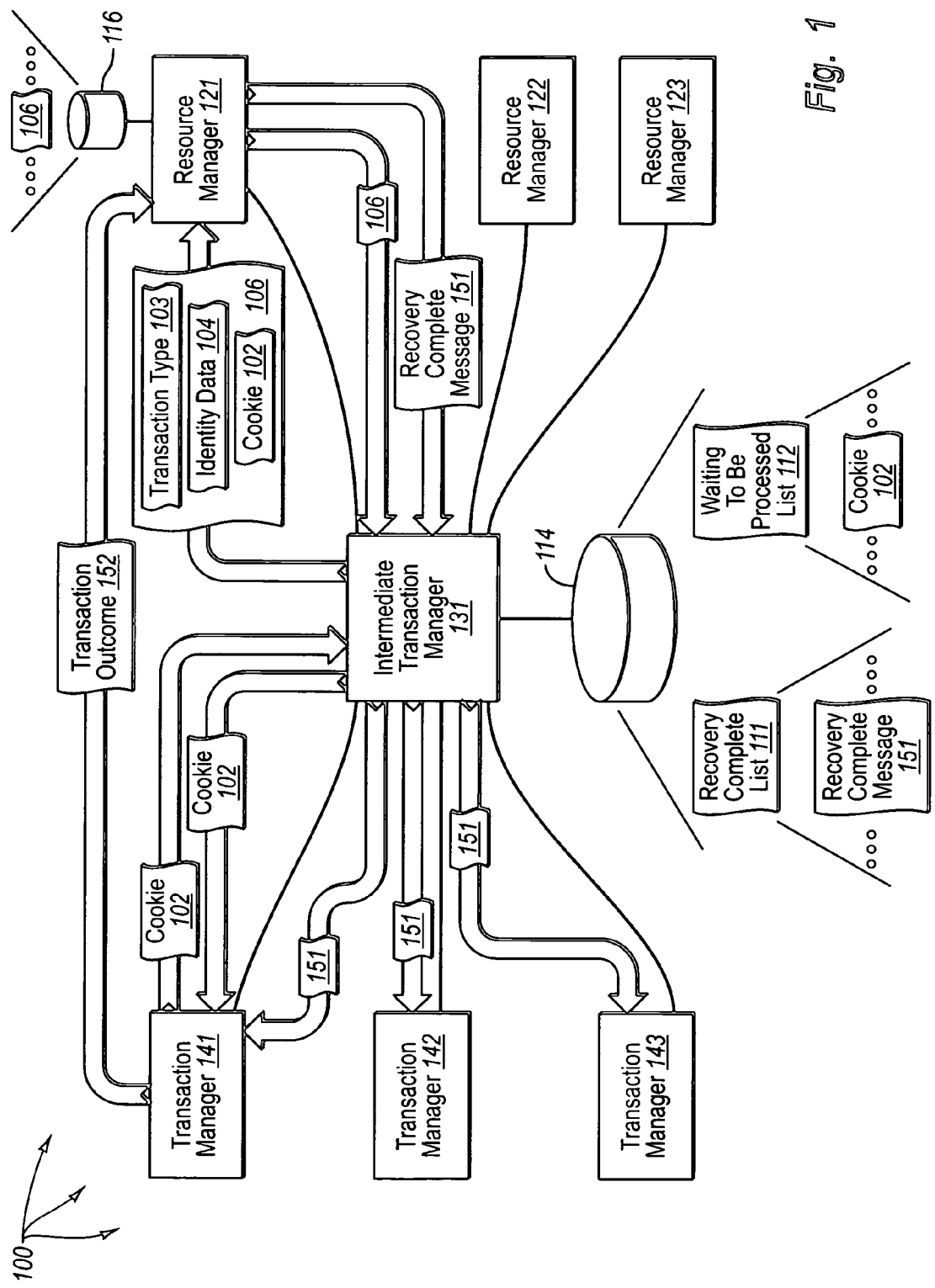
FIG. 1 illustrates an example of a computer architecture that facilitates maintaining correct transaction results when transaction management configurations change.

The principles of the present invention provide for maintaining correct transaction results when transaction management configurations change. The foregoing problems with the prior state of the art are overcome by the principles of the present invention, which are directed towards methods, systems, data structures, and computer program products for maintaining correct transaction results when transaction management configurations change. An intermediate transaction manager is transparently interposed between one or more resource managers and a plurality of transaction managers. The intermediate transaction manager intercepts and multiplexes communication (e.g., calls and notifications) between the one or more resource managers and the plurality of transaction managers.

A transaction manager, from among the plurality of transaction managers, sends a recovery cookie to a resource manager, for example, so that the resource manager can recover the correct outcome of a transaction between the transaction manager and the resource manager when the transaction fails. An intermediate transaction manager intercepts the recovery cookie and wraps with transaction manager type information and identity information that differentiate the transaction manager from the other transaction managers. Accordingly, the transaction manager type information and identity information can be used to re-attach to the transaction manager to recover the correct outcome of the transaction.

The intermediate transaction manager sends the wrapped recovery cookie to the resource manager. The resource manager receives and stores the wrapped recovery cookie. Subsequently, the resource manager detects that the transaction between the transaction manager and the resource manager has failed. In response to detecting the failure, the resource manager sends the wrapped recovery cookie to a transaction manager.

The intermediate transaction manager intercepts the wrapped recovery cookie. The intermediate transaction manager utilizes the transaction manager type information and identity information included in the wrapped recovery cookie to identify to the transaction manager. The intermediate transaction manager sends the recovery cookie to the transaction manager.

The transaction manager receives the recovery cookie and, in response to the recovery cookie, sends the outcome of the transaction to the resource manager. The resource manager receives the outcome of the transaction.

The intermediate transaction manager can also intercept recovery-complete calls from a specific resource manager and send the recovery-complete call to each of the plurality of transaction managers. Resource managers can receive, store, and send wrapped recovery cookies.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a computer architecture 100 that facilitates maintaining correct transaction results when transaction management configurations change. As depicted in computer architecture 100, intermediate transaction manager 131 is connected between transaction managers 141, 142, and 143 and resource managers 121, 122, and 123. The connections between intermediate transaction manager 131, transaction managers 141, 142, and 143 and resource managers 121, 122, and 123 can be included in virtually any type of network, such as, for example, a system bus, a Local Area Network ("LAN"), a Wide Area Network ("WAN") or even the Internet.

As depicted in computer architecture 100, intermediate transaction manager 131, transaction managers 141, 142, and 143 and resource managers 121, 122, and 123 can be at the same or different computer systems. Intermediate transaction manager 131, transaction managers 141, 142, and 143 and resource managers 121, 122, and 123 can receive data from and send data to one another. Similar, data can be received from and send to other modules and computer systems (not shown) that are connected to common networks with intermediate transaction manager 131, transaction managers 141, 142, and 143 and resource managers 121, 122, and 123.

Accordingly, intermediate transaction manager 131, transaction managers 141, 142, and 143 and resource managers 121, 122, and 123 can participate in transactions utilizing a variety of different transaction protocols, such as, for example, WS-AtomicTransaction, Microsoft Distributed Transaction Coordinator (MSDTC), Ole Transactions (Oletx), Transaction Internet Protocol (TIP), etc. Transaction protocols can be utilized to implement a two-phase commit protocol between a transaction manager and a resource manager. In a network environment, transaction protocols can be layered on top of and transferred in accordance with other lower layer protocols, such as, for example Internet Protocol ("IP") and other protocols that utilize IP datagrams, such as, Transmission Control Protocol ("TCP") and Hypertext Transfer Protocol ("HTTP").

Transaction management can be distributed across each of the transaction managers 141, 142, and 142 (as well as other transaction managers). Thus, each of the transaction managers 141, 142, and 142 can be assigned specific transaction related tasks. Accordingly, when implementing a transaction, a resource manager (e.g., selected form among resource managers 121, 122, and 123) may communicate with one or more of the transaction managers 141, 142, and 143. The resource manager may or may not be aware that transaction management is distributed across different transaction managers.

Intermediate transaction manager 131 is interposed between transaction managers 141, 142, and 143 and resource managers 121, 122, and 123 such that intermediate transaction manager 131 can intercept calls (e.g., reenlist calls) and notifications (e.g., prepare notifications sent as part of a two-phase commit) that are exchanged between transaction managers and resource managers. Intermediate transaction manager 131 is configured to present a transaction manager interface to resource managers and is configured to provide a resource manager interface to transaction managers. Further, intermediate transaction manager 131 can provide a plurality of interfaces simultaneously such that intermediate transaction manager 131 can multiplex communication (e.g., related to transactions) between resource managers resource managers 121, 122, and 123 and transaction managers 141, 142, and 143.

Thus, intermediate transaction manager 131 is transparent to resource managers 121, 122, and 123 and transaction managers 141, 142, and 143. That is, the configuration of intermediate transaction manager 131 makes it appear to a transaction manager that the transaction manager is communicating directly with an appropriate resource manager. Likewise, the configuration of intermediate transaction manager 131 makes it appear to a resource manager that the resource manager is communicating directly with an appropriate transaction manager. Accordingly, intermediate transaction manager 131 can more easily be integrated into distributed transactional management systems.

Figure 2:
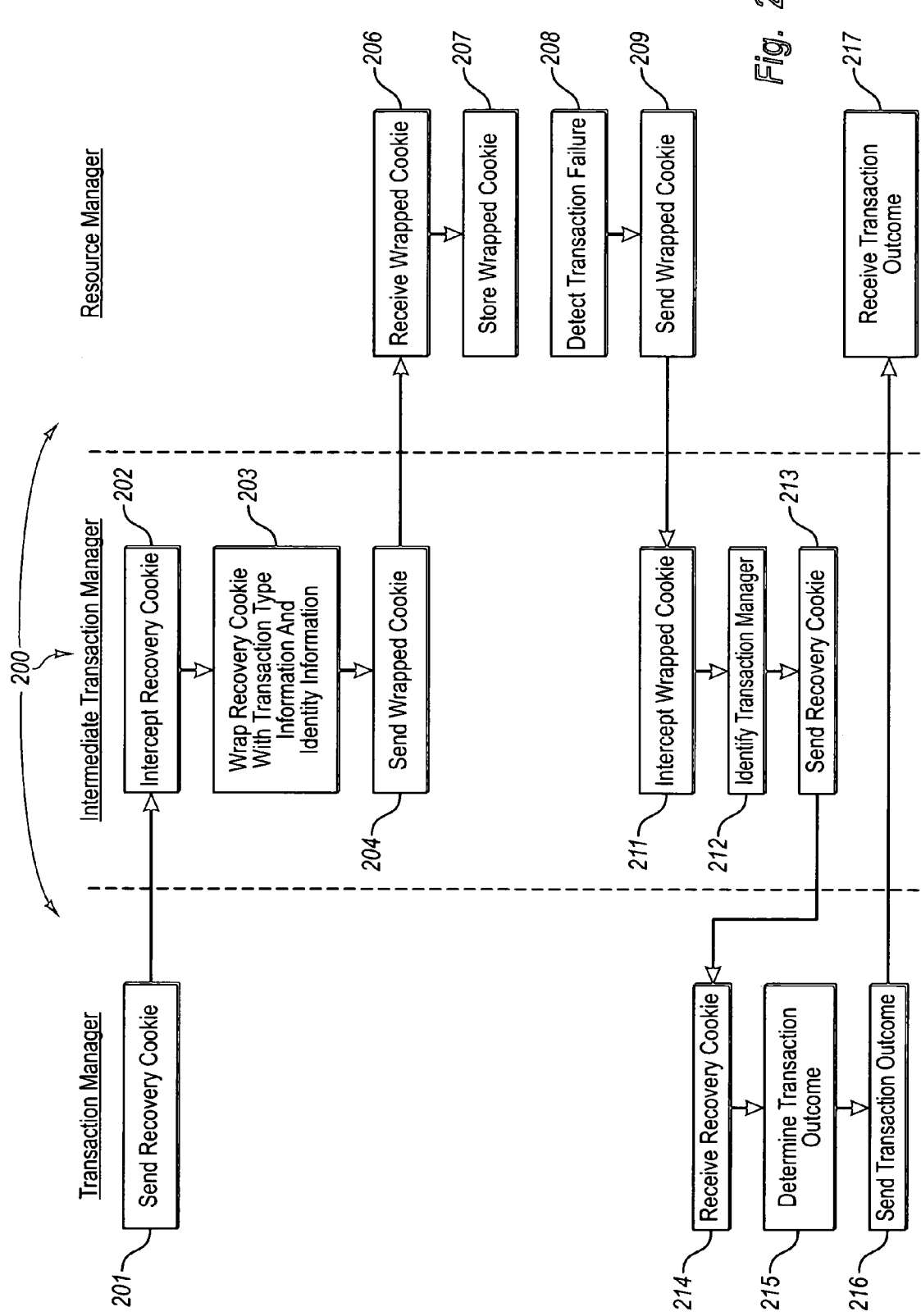
FIG. 2 illustrates an example flow chart of a method for maintaining correct transaction results when transaction management configurations change.

FIG. 2 illustrates an example flow chart of a method 200 for maintaining correct transaction results when transaction management configurations change. The method 200 will be with respect to the components and data in computer architecture 100.

Method 200 includes an act of sending a recovery cookie (act 201). For example, transaction manager 141 can send cookie 102 to resource manager 121. Transaction manager 141 can send cookie 102 along with a prepare notification message. The prepare notification message can be sent as part of a two-phase commit protocol for a transaction between transaction manager 141 and resource manager 121. Recovery cookie 102 can be configured such that resource manager 121 can use recovery cookie 102 to recover the correct outcome of the transaction when the transaction fails. For example, recovery cookie 102 can contain transaction related information (e.g., pointers to log entries) that identifies the transaction. Thus, when transaction manager 141 receives recovery cookie 102, transaction manager 141 can determine the outcome of the transaction (e.g., by replaying log entries).

Method 200 includes an act of intercepting a recovery cookie (act 202). For example, intermediate transaction manager 131 can intercept cookie 102 (e.g., from the prepare notification for the transaction). As previously described, resource manager 131 can use recovery cookie 102 to recover the correct outcome of a transaction between transaction manager 141 and resource manager 121 when the transaction fails. Intermediate transaction manager 131 can determine that recovery cookie 102 was sent to resource manager 121 based on information in an intercepted prepare notification.

Method 200 includes an act of wrapping the recovery cookie with transaction manager type information and identity information (act 203). For example, intermediate transaction manager 131 can wrap cookie 102 with transaction manager type 103 and identity data 104. Transaction manager type 103 can identify a type of transaction manager, such as, for example, WS-Atomic Transaction, Microsoft Distributed Transaction Coordinator (MSDTC), Ole Transactions (Oletx), Transaction Internet Protocol (TIP), etc., corresponding to transaction manager 141. Identity data 104 can be data, such as, for example, an instance identifier, Coordination Context, node name, URL, etc., used by a transaction manager 141 to locate the correct result of the transaction. Transaction manager type 103 and identify data 104 can be used (e.g., by intermediate transaction manager 131) to re-attach to transaction manager 141 to recover the correct outcome of the transaction.

Method 200 includes an act of sending the wrapped recovery cookie to the resource manager (act 204). For example, intermediate transaction manager 131 can send message 106, including cookie 102, transaction manager type 103, and identity data 104, to resource manager 121. Intermediate transaction manager 131 can configure message 106 to be of a format similar or identical to a recovery cookie (e.g., cookie 102) such that resource manager 121 can compatibly receive and store message 106 as a recovery cookie (even though message 106 includes additional data).

Method 200 includes an act of receiving a wrapped cookie (act 206). For example, resource manager 121 can receive message 106, including cookie 102, transaction manager type 103, and identity data 104, from intermediate transaction manager 131. Method 200 includes an act of storing the wrapped recovery cookie (act 207). For example, resource manager 121 can store message 106 in storage 116. A series of three consecutive periods (i.e., an ellipsis) indicates that other recovery cookies and/or other wrapped recovery cookies can be stored at storage 116 along with message 106.

Method 200 includes an act of detecting a transaction failure (act 208). For example, resource manager 121 can detect a failure in a transaction between transaction manager 141 and resource manager 121. A detected failure can result from a malfunction of resource manager 121 or a computer system that supports resource manager 121, a loss of communication between transaction manager 141 and resource manager 121, a malfunction of transaction manager 141 or a computer system that supports transaction manager 141, etc. For example, during re-boot of a computer system that supports resource manager 121, resource manager 121 can be brought online and subsequently identify transactions that are "in doubt."

Method 200 includes an act of sending the wrapped cookie (act 209). For example, in response to the detected transaction failure, resource manager 121 (can retrieve from storage 116 and) send message 106 to transaction manager 141. Message 106 can be sent as part of a reenlist call issued by resource manager 121.

Method 200 includes an act of intercepting the wrapped cookie (act 211). For example, intermediate transaction manager 131 can intercept message 106, including cookie 102, transaction manager type 103, and identity data 104, from resource manager 121. Intermediate transaction manager 131 can determine that message 106 was sent from resource manager 121. For example, based on information in an intercepted reenlist call, intermediate transaction manager 131 can determine that resource manager 121 initiated the reenlist call.

Method 200 includes an act of utilizing the transaction manager type information and identity information to identify to the transaction manager (act 212). For example, intermediate transaction manager 131 can use transaction manager type 103 and identity data 104 to identify transaction manager 141. Since cookie 102 is wrapped in the identity of transaction manager 141, intermediate transaction manager 131 can determine that cookie 102 is to be sent to transaction manager 141. Thus, intermediate transaction manager 131 can determine that cookie 102 corresponds to a transaction between transaction manager 141 and resource manager 121.

Subsequent to identifying transaction manager 141, intermediate transaction manager 131 can determine if transaction manager 141 is currently active. In some embodiments, intermediate transaction manager 131 maintains a list of active transaction managers. As transaction managers become active, the transaction managers register their existence and identity with intermediate transaction manager 131. From time to time, intermediate transaction manager 131 can query registered transaction managers to verify that the transaction managers are still active. Thus, in these embodiments, intermediate transaction manager 131 can refer to the list of active transaction managers to determine if transaction manager 141 is currently active.

Alternately, in other embodiments, intermediate transaction manager 131 can query transaction manager 141, for example, subsequent to identification based on transaction manager type 103 and identity data 104, to determine if transaction manager 141 is currently active.

When transaction manager 141 is not currently active, intermediate transaction manager 131 can store cookie 102 in a waiting to be processed list 112 at storage 114. The ellipses indicate that other recovery cookies can be stored in a waiting to be processed list 112 along with message cookie 102. Intermediate transaction manager 131 can store cookie 102 in a waiting to be processed list 112 until transaction manager 141 is (re)activated (e.g., a registration is detected or a query indicates that transaction manager 141 is active).

Further, intermediate transaction manager 131 can also utilize transaction manager type 103 and identity data 104 to instantiate (activate) transaction manager 141. Thus, recovery can be completed more efficiently, for example, when transaction manager 141 is rarely used.

Accordingly, intermediate transaction manager 131 causes it to appear to resource manager 121 that cookie 102 was successful delivered to the appropriate transaction manager, even though cookie 102 may be stored in a waiting to be processed list 112 for some amount of time. Intermediate transaction manager 131, can store a recovery cookie for a user-configurable amount of time before deleting the recovery cookie.

Method 200 includes an act of sending the recovery cookie (act 213). For example, subsequent to detecting that transaction manager 141 is active, intermediate transaction manager 131 can send cookie 102 to transaction manager 141. Intermediate transaction manager 131 can send cookie 102 to indicate that resource manager 121 is attempting to recover the correct outcome of a transaction between resource manager 121 and transaction manager 141.

Method 200 includes an act of receiving the recovery cookie (act 214). For example, transaction manager 141 can receive cookie 102 from intermediate transaction manager 131.

Method 200 includes an act of determining the transaction outcome (act 215). For example, transaction manager 141 can determine the outcome of the transaction between transaction manager 141 and resource manager 121. Reception of cookie 102 indicates to transaction manager 141 that resource manager 121 is attempting to recover the correct outcome of the transaction. For example, transaction manager 141 can process cookie 102 to locate log entries that identify the transaction between transaction manager 141 and resource manager 121. One or more located log entries can indicate the outcome of the transaction (e.g., whether the transaction was committed or aborted).

Method 200 includes an act of sending the transaction outcome (act 216). For example, transaction manager 141 send transaction outcome 152 (including the retrieved the outcome from the located log entries) to resource manager 121. Method 200 includes an act of receiving the transaction outcome (act 217). For example, resource manager 121 can receive transaction outcome 152 from transaction manager 141. Based on transaction action outcome 152 resource manager can either abort or commit the transaction so that resource manager 121 is no longer "in doubt" with respect to the transaction.

Subsequent to reenlisting in all "in doubt" transactions, a resource manager can issue a recovery-complete call. It may be that a recovery-complete call is issued after the last remaining "in doubt" transaction is resolved. Thus, it may be that the recovery-complete call is directed to a single (and the last) transaction manager.

Intermediate transaction manager 131 can intercept the recovery-complete call and send the recovery-complete call to all active transaction managers. For example, intermediate transaction manager 131 can intercept recovery complete message 151 and send recovery complete message 151 to each of transaction managers 141, 142, and 143.

Sending the recovery-complete call to all active transaction managers allows the transaction managers to free up log space. For example, it may be that transaction manager has determined that a corresponding resource manager is "in doubt" with respect to a transaction. However, the resource manager may determine that it is not "in doubt" with respect to the transaction. Thus, it is unlikely that the resource manager will send a recovery cookie or other communication related to the transaction. However, receipt of a recovery-complete call indicates that the resource manager will send no further communication related to the transaction. Thus, transaction manager can remove log entries related to the transaction to free up log space.

If a transaction manager is not active when a recovery-complete message is received, the recovery complete message is stored in a recovery complete list. For example, intermediate transaction manager 131 can store recovery complete message 151 in recovery complete list 111 and storage 114. Recovery complete message 151 can be sent to transaction managers as the transaction managers are (re) activated. For example, if transaction manager 143 was inactive when recovery complete message 151 was received, recovery complete message 151 would not be sent to transaction manager 143 at that time. However, upon detecting that transaction manager 143 is again active (e.g., registered), intermediate transaction manager can send recovery complete message 151 to transaction manager 143. Thus, recovery complete messages can be used to free log space even at transaction managers that inactive when a recovery-complete call is issued.

Embodiments of the invention have been described with respect to a single transaction between a single transaction manager and a single resource manager. However, it would be apparent to one skilled in the art, after having reviewed this description, that the principles of the present invention are also applicable to a plurality of transactions occurring in parallel and/or to more complex transactions. Embodiments of the present invention can maintain correct transaction results when transaction management configurations change among a plurality of transaction managers and corresponding resource managers participating in the same or different transactions. For example, intermediate transaction manager 131 can be configured to transparently wrap, open, and store recovery cookies from a plurality of transaction managers and for a plurality of corresponding resources managers participating in a transaction in parallel. Further, intermediate transaction manager 131 can be configured to transparently wrap, open, and store recovery cookies for a plurality of different transactions occurring in parallel.

Throughout this description different transaction manager types and identity data have been expressly described. However, it should be understood that the expressly described transaction manager types and identity data are merely examples of some transaction manager types and identity data that can be used to implement the invention. It would be apparent to one skilled in the art, after having reviewed this description, that other transaction manager types and identity data, in addition to the expressly described transaction manager types and identity data, can be used in different embodiments of the present invention.

Figure 3:
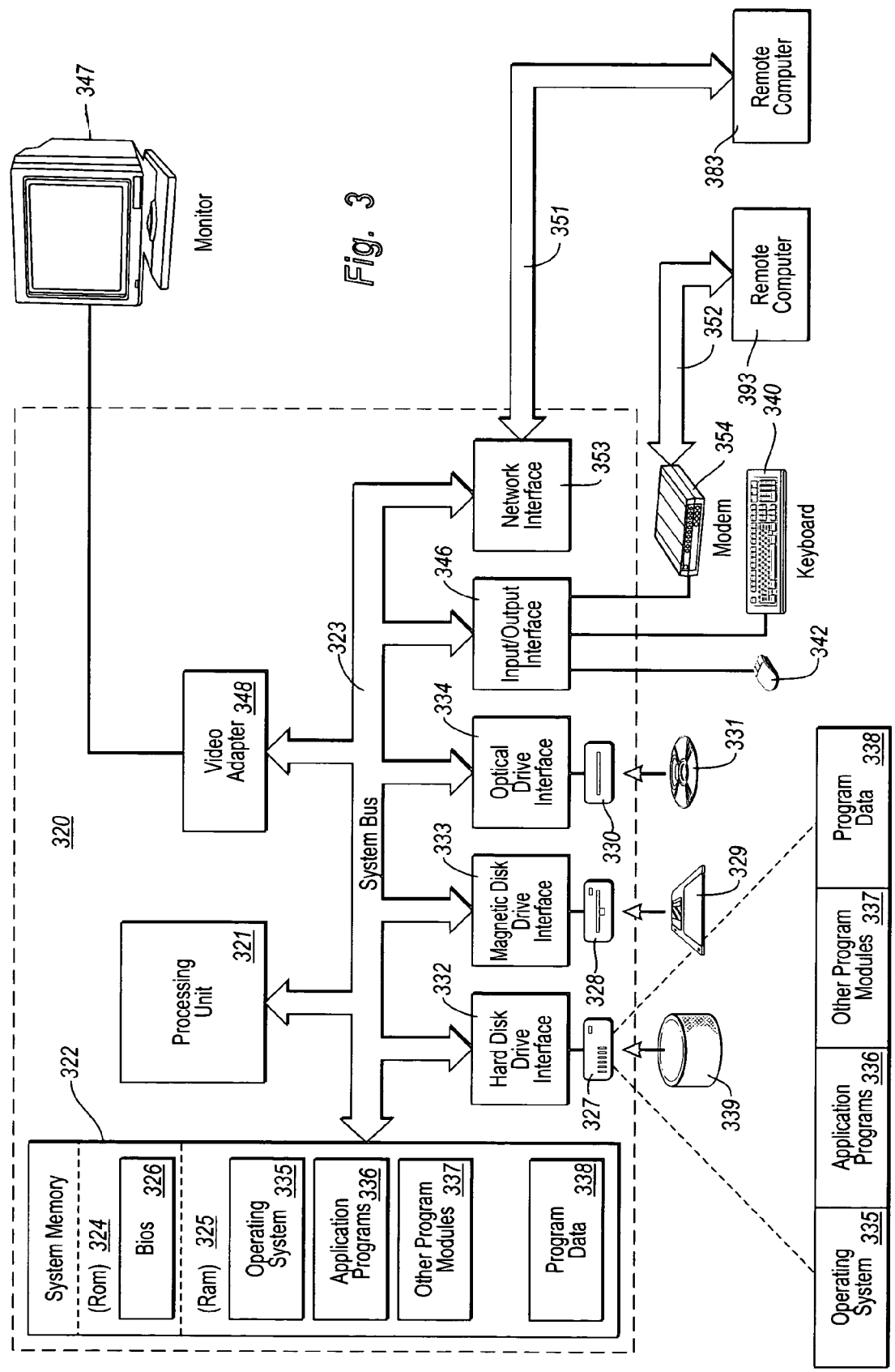
FIG. 3 illustrates a suitable operating environment for the principles of the present invention.

Turning now to FIG. 3, FIG. 3 illustrates a suitable operating environment for the principles of the present invention. FIG. 3 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 3, an example system for implementing the invention includes a general-purpose computing device in the form of computer system 320, including a processing unit 321, a system memory 322, and a system bus 323 that couples various system components including the system memory 322 to the processing unit 321. Processing unit 321 can execute computer-executable instructions designed to implement features of computer system 320, including features of the present invention. The system bus 323 may be any of several types of bus structures including a memory bus or memory controller, a peripheral bus, and a local bus using any of a variety of bus architectures. The system memory includes read only memory ("ROM") 324 and random access memory ("RAM") 325. A basic input/output system ("BIOS") 326, containing the basic routines that help transfer information between elements within computer system 320, such as during start-up, may be stored in ROM 324.

The computer system 320 may also include magnetic hard disk drive 327 for reading from and writing to magnetic hard disk 339, magnetic disk drive 328 for reading from or writing to removable magnetic disk 329, and optical disk drive 330 for reading from or writing to removable optical disk 331, such as, or example, a CD-ROM or other optical media. The magnetic hard disk drive 327, magnetic disk drive 328, and optical disk drive 330 are connected to the system bus 323 by hard disk drive interface 332, magnetic disk drive-interface 333, and optical drive interface 334, respectively. The drives and their associated computer-readable media provide non-volatile storage of computer-executable instructions, data structures, program modules, and other data for the computer system 320. Although the example environment described herein employs magnetic hard disk 339, removable magnetic disk 329 and removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 339, magnetic disk 329, optical disk 331, ROM 324 or RAM 325, including an operating system 335, one or more application programs 336, other program modules 337, and program data 338. A user may enter commands and information into computer system 320 through keyboard 340, pointing device 342, or other input devices (not shown), such as, for example, a microphone, joy stick, game pad, scanner, or the like. These and other input devices can be connected to the processing unit 321 through input/output interface 346 coupled to system bus 323. Input/output interface 346 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 347 or other display device is also connected to system bus 323 via video interface 348. Other peripheral output devices (not shown), such as, for example, speakers and printers, can also be connected to computer system 320.

Computer system 320 is connectable to networks, such as, for example, an office-wide or enterprise-wide computer network, a home network, an intranet, and/or the Internet. Computer system 320 can exchange data with external sources, such as, for example, remote computer systems, remote applications, and/or remote databases over such networks.

Computer system 320 includes network interface 353, through which computer system 320 receives data from external sources and/or transmits data to external sources. As depicted in FIG. 3, network interface 353 facilitates the exchange of data with remote computer system 383 via link 351. Network interface 353 can logically represent one or more software and/or hardware modules, such as, for example, a network interface card and corresponding Network Driver Interface Specification ("NDIS") stack. Link 351 represents a portion of a network (e.g., an Ethernet segment), and remote computer system 383 represents a node of the network.

Likewise, computer system 320 includes input/output interface 346, through which computer system 320 receives data from external sources and/or transmits data to external sources. Input/output interface 346 is coupled to modem 354 (e.g., a standard modem, a cable modem, or digital subscriber line ("DSL") modem) via link 359, through which computer system 320 receives data from and/or transmits data to external sources. As depicted in FIG. 3, input/output interface 346 and modem 354 facilitate the exchange of data with remote computer system 393 via link 352. Link 352 represents a portion of a network and remote computer system 393 represents a node of the network.

While FIG. 3 represents a suitable operating environment for the present invention, the principles of the present invention may be employed in any system that is capable of, with suitable modification if necessary, implementing the principles of the present invention. The environment illustrated in FIG. 3 is illustrative only and by no means represents even a small portion of the wide variety of environments in which the principles of the present invention may be implemented.

In accordance with the present invention, modules including resource managers, intermediate transaction managers, and transaction managers, as well as well as associated data including recovery cookies, wrapped recovery cookies, transaction types, identity information, recovery complete lists, recovery complete messages, and waiting to be processed lists, may be stored and accessed from any of the computer-readable media associated with computer system 320. For example, portions of such modules and portions of associated program data may be included in operating system 335, application programs 336, program modules 337 and/or program data 338, for storage in system memory 322.

When a mass storage device, such as, for example, magnetic hard disk 339, is coupled to computer system 320, such modules and associated program data may also be stored in the mass storage device. In a networked environment, program modules depicted relative to computer system 320, or portions thereof, can be stored in remote memory storage devices, such as, system memory and/or mass storage devices associated with remote computer system 383 and/or remote computer system 393. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for providing a resource manager with recovery data for recovering the results of a transaction, the method comprising:

at an intermediate transaction manager separate from, and disposed between, one or more resource managers and a plurality of transaction managers, the plurality of transaction managers including a plurality of different types of transaction managers and the intermediate transaction manager providing a transparent interface for the plurality of transaction managers to communicate with the one or more resource managers with the transparent interface of the intermediate transaction manager causing it to appear to the plurality of transaction managers that they communicate directly with the one or more resource managers, intercepting a recovery cookie directed from one of the plurality of different types of transaction managers, the intercepted cookie being directed from the one of the plurality of different types of transaction managers to a resource manager, the recovery cookie for use by the resource manager to recover the correct outcome of a transaction between the transaction manager and the resource manager when the transaction fails, wherein intercepting the cookie by the intermediate transaction manager causes the intermediate transaction manager to act transparently to the one of the plurality of transaction managers as the intercepted recovery cookie is directed by the one of the plurality of transaction managers to the resource manager;

following intercepting of the recovery cookie, an act of the intermediate transaction manager wrapping the recovery cookie with transaction manager type information and identity information, the transaction manager type information and identity information differentiating the transaction manager from the other transaction managers wherein the transaction manager type information and identity information are useable to re-attach to the transaction manager to recover the correct outcome of the transaction;

after wrapping the recovery cookie, an act of the intermediate transaction manager sending the wrapped recovery cookie to the resource manager; and an act of the intermediate transaction manager receiving a recovery-complete message from the resource manager and sending the recovery-complete message to each of the plurality of transaction managers that are identified in a list maintained by the intermediate transaction manager, the list identifying only transaction managers that are currently active.

2. The method as recited in claim 1, wherein the act of intercepting a recovery cookie comprises an act of intercepting a prepare message from the transaction manager.

3. The method as recited in claim 1, wherein the act of intercepting a recovery cookie comprises an act of intercepting recovery data that identifies one or more log entries at the transaction manager.

4. The method as recited in claim 1, wherein the act of intercepting a recovery cookie comprises an act of transparently intercepting the recovery cookie thereby causing it to appear to the transaction manager that the cookie was received by the resource manager.

5. The method as recited in claim 1, wherein the act of wrapping the recovery cookie comprises the act of wrapping the recovery cookie with transaction manager type information that identifies the transaction manager type of the transaction manager.

6. The method as recited in claim 5, wherein the act of wrapping the recovery cookie with transaction manager type information that identifies the transaction manager type of the transaction manager comprises an act of wrapping the recovery cookie with transaction manager type information that identifies the transaction manager as a specified transaction manager type selected from among WS-Atomic Transactions, Microsoft Distributed Transaction Coordinator (MS-DTC), and Transaction Internet Protocol (TIP).

7. The method as recited in claim 1, wherein the act of wrapping the recovery cookie comprises an act of wrapping the recovery cookie with identity data that identifies a specified instance of the transaction manager.

8. The method as recited in claim 7, wherein the act of wrapping the recovery cookie with identity data that identifies the specified instance of the transaction manager comprises an act of wrapping the recovery cookie with identity data that identifies a specified instance of the transaction manager, the identity data selected from among Coordination Context, node name, and URL.

9. The method as recited in claim 1, wherein the act of sending the wrapped recovery cookie to the resource manager comprises an act of transparently sending the wrapped cookie thereby causing it to appear to the resource manager that a recovery cookie was sent from the transaction manager.

10. The method as recited in claim 1, wherein the act of sending the wrapped recovery cookie to the resource manager comprises an act of transparently sending the wrapped cookie thereby causing it to appear to the resource manager that a prepare message was issued by the transaction manager.

11. A method for recovering the results of a transaction, the method comprising:

at an intermediate transaction manager separate from, and disposed between, one or more resource managers and a plurality of different types of transaction managers and which provides a transparent interface for the one or more resource managers to communicate with the plurality of transaction managers such that it appears to the plurality of different types of transaction managers that they communicate directly with the one or more resource managers, intercepting a wrapped recovery cookie directed to a transaction manager from a resource manager, the recovery cookie being wrapped with transaction manager type information and identity information identifying a transaction manager from among the plurality of transaction managers, the recovery cookie corresponding to a transaction between the resource manager and the identified transaction manager, wherein intercepting the wrapped cookie by the intermediate transaction manager causes the intermediate transaction manager to act transparently to the resource manager as the intercepted wrapped recovery cookie is directed by resource manager to the transaction manager;

following intercepting of the wrapped recovery cookie, an act of the intermediate transaction manager utilizing the transaction manager type information and identity information to identify to the transaction manager;

after identifying to the transaction manager, an act of the intermediate transaction manager sending the recovery cookie to the identified transaction manager to indicate that the resource manager is attempting to recover the correct outcome of the transaction; and an act of the intermediate transaction manager receiving a recovery-complete message from the resource manager and sending the recovery-complete message to each of the plurality of transaction managers that are identified in a list maintained by the intermediate transaction manager, the list identifying only transaction managers that are currently active.

12. The method as recited in claim 11, wherein the act of intercepting a wrapped recovery cookie from a resource manager comprises an act of transparently intercepting the wrapped recovery cookie thereby causing it to appear to the resource manager that the wrapped recovery cookie was delivered to the transaction manager.

13. The method as recited in claim 11, wherein the act of intercepting a wrapped recovery cookie from a resource manager comprises an act of transparently intercepting a reenlist call.

14. The method as recited in claim 11, wherein the act of intercepting a wrapped recovery cookie from a resource manager comprises an act of intercepting a wrapped recovery cookie that includes transaction manager type information that identifies the transaction manager type of the transaction manager.

15. The method as recited in claim 14, wherein the act of intercepting a wrapped recovery cookie that includes transaction manager type information that identifies the transaction manager type of the transaction manager comprises an act of intercepting a wrapped recovery cookie that includes transaction manager type information that identifies the transaction manager as a specified transaction manager type selected from among WS-Atomic Transactions, Microsoft Distributed Transaction Coordinator (MSDTC), and Transaction Internet Protocol (TIP).

16. The method as recited in claim 11, wherein the act of intercepting a wrapped recovery cookie from a resource manager comprises an act of intercepting a wrapped the recovery cookie that includes identity data identifying a specified instance of the transaction manager.

17. The method as recited in claim 16, wherein the act of intercepting a wrapped the recovery cookie that includes identity data identifying a specified instance of the transaction manager comprises an act of intercepting a wrapped recovery cookie that includes identity data identifying a specified instance of the transaction manager, the identity data selected from among Coordination Context, node name, and URL.

18. The method as recited in claim 11, wherein the act of utilizing the transaction manager type information and identity information to attach to the identified transaction manager comprises an act of utilizing the transaction manager type information and identity information to instantiate the identified transaction manager.

19. The method as recited in claim 11, wherein the act of sending the recovery cookie to the identified transaction manager comprises an act of transparent sending the recovery cookie to the transaction manager thereby causing it to appear to the transaction manager that the recovery cookie was sent from the resource manager.

20. The method as recited in claim 11, wherein the act of sending the recovery cookie to the identified transaction comprises an act of transparent sending the recovery cookie to the transaction manager thereby causing it to appear to the transaction manager that a reenlist call was made by the resource manager.

21. The method as recited in claim 11, further comprising:
an act of detecting that the identified transaction manager is not currently active; and
an act of storing the recovery cookie in a waiting to be processed list prior to sending the recovery cookie to the identified transaction manager.

22. The method as recited in claim 11, further comprising:
an act of opening the wrapper on the recovery cookie to retrieve transaction manager type information and identity information prior to attaching to the transaction manager.

23. A computer program product for implementing a method for providing a resource manager with recovery data for recovering the results of a transaction, the computer program product comprising one or more computer-readable storage media having stored thereon computer-executable instructions that, when executed:
cause an intermediate transaction manager separate from, and disposed between, one or more resource managers and a plurality of different types of transaction managers and which provides a transparent interface for the plurality of transaction managers to communicate with the one or more resource managers such that it appears to the plurality of different types of transaction managers that they communicate directly with the one or more resource managers, to intercept a recovery cookie directed from one of the plurality of different types of transaction managers, the intercepted cookie being directed from the one of the plurality of different types of transaction managers to a resource manager, the recovery cookie for use by the manager to recover the correct outcome of a transaction between the transaction manager and the resource manager when the transaction fails, wherein intercepting the cookie by the intermediate transaction manager causes the intermediate transaction manager to act transparently to the one of the plurality of transaction managers as the intercepted recovery cookie is directed by the one of the plurality of transaction managers to the resource manager;
cause the intermediate transaction manager to, following intercepting of the recovery cookie, wrap the recovery cookie with transaction manager type information and identity information, the transaction manager type information and identity information differentiating the transaction manager from the other transaction managers wherein the transaction manager type information and identity information are useable to re-attach to the transaction manager to recover the correct outcome of the transaction;
cause the intermediate transaction manager to, after wrapping the recovery cookie, send the wrapped recovery cookie to the resource manager; and
cause the intermediate transaction manager to receive a recovery-complete message from the resource manager and send the recovery-complete message to each of the plurality of transaction managers that are identified in a list maintained by the intermediate transaction manager, the list identifying only transaction managers that are currently active.

24. The computer program product as recited in claim 23, wherein computer-executable instructions that, when executed, cause the intermediate transaction manager to intercept a recovery cookie from a transaction manager from among the plurality of transaction managers comprise computer-executable instructions that, when executed, cause the intermediate transaction manager to intercept a prepare message.

25. The computer program product as recited in claim 23, wherein computer-executable instructions that, when executed, cause the intermediate transaction manager to intercept a recovery cookie from a transaction manager from among the plurality of transaction managers comprise computer-executable instructions that, when executed, cause the intermediate transaction manager to transparently intercept the recovery cookie thereby causing it to appear to the transaction manager that the cookie was received by the resource manager.

26. The computer program product as recited in claim 23, wherein computer-executable instructions that, when executed, cause the intermediate transaction manager to wrap the recovery cookie comprise computer-executable instructions that, when executed, cause the intermediate transaction manager to wrap the recovery cookie with transaction manager type information that identifies the transaction manager type of the transaction manager.

27. The computer program product as recited in claim 23, wherein computer-executable instructions that, when executed, cause the intermediate transaction manager to wrap the recovery cookie comprise computer-executable instructions that, when executed, cause the intermediate transaction manager to wrap the recovery cookie with transaction manager type information that identifies the transaction manager as a specified transaction manager type selected from among WS-Atomic Transactions, Microsoft Distributed Transaction Coordinator (MSDTC), and Transaction Internet Protocol (TIP).

28. The computer program product as recited in claim 23, wherein computer-executable instructions that, when executed, cause the intermediate transaction manager to wrap the recovery cookie comprise computer-executable instructions that, when executed, cause the intermediate transaction manager to wrap the recovery cookie with identity data that identifies a specified instance of the transaction manager, the identity data selected from among Coordination Context, node name, and URL.

29. The computer program product as recited in claim 23, wherein computer-executable instructions that, when executed, cause the intermediate transaction manager to sending the wrapped recovery cookie to the resource manager comprises computer-executable instructions that, when executed, cause the intermediate transaction manager to transparently send the wrapped cookie thereby causing it to appear to the resource manager that a recovery cookie was sent from the transaction manager.

30. A computer program product for implementing a method for recovering the results of a transaction, the computer program product comprising one or more computer-readable storage media having stored thereon computer-executable instructions that, when executed:
cause an intermediate transaction manager separate from, and disposed between, one or more resource managers and a plurality of different types of transaction managers and which provides a transparent interface for the one or more resource managers to communicate with the plurality of transaction managers with the transparent interface causing it to appear to the plurality of transaction managers that they communicate directly with the one or more resource managers, to intercept a wrapped recovery cookie from a resource manager, the wrapped recovery cookie being wrapped with transaction manager type information and identity information identifying a transaction manager from among the plurality of transaction managers, the wrapped recovery cookie corresponding to a transaction between the resource manager and the identified transaction manager, wherein intercepting the wrapped cookie by the intermediate transaction manager causes the intermediate transaction manager to act transparently to the resource manager as the intercepted wrapped recovery cookie is directed by resource manager to the transaction manager;
cause the intermediate transaction manager to, after intercepting of the wrapped cookie, utilize the transaction manager type information and identity information to identify to the transaction manager;
cause the intermediate transaction manager to, following identification to the transaction manager, send the recovery cookie to the identified transaction manager to indicate that the resource manager is attempting to recover the correct outcome of the transaction; and
cause the intermediate transaction manager to receive a recovery-complete message from the resource manager and send the recovery-complete message to each of the plurality of transaction managers that are identified in a list maintained by the intermediate transaction manager, the list identifying transaction managers that are currently active.

31. The computer program product as recited in claim 30, wherein computer-executable instructions that, when executed, cause the intermediate transaction manager to intercept a wrapped recovery cookie from a resource manager comprise computer-executable instructions that, when executed, cause the intermediate transaction manager to transparently intercept a reenlist call.

32. The computer program product as recited in claim 30, wherein computer-executable instructions that, when executed, cause the intermediate transaction manager to intercept a wrapped recovery cookie from a resource manager comprise computer-executable instructions that, when executed, cause the intermediate transaction manager to intercept a wrapped recovery cookie that includes transaction manager type information that identifies the transaction manager as a specified transaction manager type selected from among WS-Atomic Transactions, Microsoft Distributed Transaction Coordinator (MSDTC), and Transaction Internet Protocol (TIP).

33. The computer program product as recited in claim 30, wherein computer-executable instructions that, when executed, cause the intermediate transaction manager to intercept a wrapped recovery cookie from a resource manager comprise computer-executable instructions that, when executed, cause the intermediate transaction manager to intercept a wrapped recovery cookie that includes identity data identifying a specified instance of the transaction manager, the identity data selected from among Coordination Context, node name, and URL.

34. The computer program product as recited in claim 30, wherein computer-executable instructions that, when executed, cause the intermediate transaction manager to utilize the transaction manager type information and identity information to identify to the transaction manager comprise computer-executable instructions that, when executed, cause the intermediate transaction manager to utilize the transaction manager type information and identity information to instantiate the identified transaction manager.

35. The computer program product as recited in claim 30, wherein computer-executable instructions that, when executed, cause the intermediate transaction manager to send the recovery cookie to the identified transaction comprise computer-executable instructions that, when executed, cause the intermediate transaction manager to transparently send the recovery cookie to the transaction manager thereby causing it to appear to the transaction manager that a reenlist call was made by the resource manager.

36. The computer program product as recited in claim 30, further comprising computer-executable instructions that, when executed, cause the intermediate transaction manager to perform the following:
detect that the identified transaction manager is not currently active; and
store the recovery cookie in a waiting to be processed list prior to sending the recovery cookie to the identified transaction manager.

37. The computer program product as recited in claim 30, further comprising computer-executable instructions that, when executed, cause the intermediate transaction manager to perform the following:
open the wrapper on the recovery cookie to retrieve transaction manager type information and identity information prior to attaching to the transaction manager.

38. A computer system, comprising:
one or more processors;
system memory; and
one or more computer-readable storage media having stored thereon an intermediate transaction manager, the intermediate transaction manager configured to:
be interposed between one or more resource managers and a plurality of different types of transaction managers as a transparent interface for the transaction managers to communicate with the one or more resource managers and for the one or more resource managers to communicate with the transaction managers, thereby causing it to appear to the transaction managers that they communicate directly with the one or more resource managers, and causing it to appear to the one or more resource managers that they communicate directly with the transaction managers;

intercept and multiplex calls and notifications between the one or more resource managers and the plurality of transaction managers;

intercept recovery cookies directed to a resource manager from a transaction manager and thereafter wrap the intercepted recovery cookies with (i) transaction manager type information, and (ii) transaction manager identity information, and send the wrapped recovery cookies to the resource manager, the wrapped recovery cookies being sent by the transaction manager along with a prepare notification message in a two-phase commit protocol and including pointers to log entries used in recovering the correct outcome of a transaction;

intercept wrapped recovery cookies directed to the transaction manager from the resource manager, utilize transaction manager type and identity information in the wrapping to identify to the transaction manager, and send the recovery cookie to the identified transaction manager as an indication that the resource manager is attempting to recover a correct outcome of the transaction, wherein wrapped recovery cookie is sent in a reenlist call and the transaction manager type information identifies a type of transaction manager and the transaction manager identity information directs the intermediate transaction manager to locate a correct result of the transaction for re-attachment to the transaction manager; and receive a recovery-complete message from the resource manager and send the recovery-complete message to each of the plurality of transaction managers that are identified in a list maintained by the intermediate transaction manager, the list identifying only transaction managers that are currently active.

39. A system as recited in claim 38, wherein the intermediate transaction manager supports a plurality of different types of transaction managers, including at least each of: WS-Atomic Transaction, MSDTC, Oletx, and TIP transaction managers, and the method further comprises:

maintaining the list of currently active transaction managers, wherein maintaining the list of currently active transaction managers includes:

receiving registration from transaction managers as they become active, the registration including registration of the existence and identity of the registering transaction manager; and querying registered transaction managers to verify that transaction managers that remain active; and after intercepting a wrapped recovery cookie directed to the transaction manager from the resource manager and identifying the transaction manager using the identity information, the transaction manager type information, and the list of currently active transaction managers and determining whether the transaction manager is currently active and:

when the transaction manager is determined to be currently active, sending the intercepted wrapped recovery cookie to the transaction manager;

when the transaction manager is determined not to be currently active, (i) storing the intercepted wrapped recovery cookie in a waiting to be processed list in storage for a user-configurable amount of time after which the intercepted wrapped recovery cookie is deleted; (ii) detecting from the list of currently active transaction managers when the transaction manager becomes active through a registration or query; (iii) making it appear to the resource manager that the intercepted wrapped recovery cookie was successfully delivered to the transaction manager even though the intercepted wrapped recovery cookie is being stored in the waiting to be processed list; (iv) when the transaction manager becomes active, forwarding the intercepted wrapped recovery cookie to the transaction manager; (v) store the recovery complete message in a recovery complete list in storage; and (vii) send the recovery complete message to other transaction managers not identified in the list of currently active transaction managers only as they become active.

* * * * *